(12) United States Patent
Monk

(10) Patent No.: US 9,818,069 B2
(45) Date of Patent: Nov. 14, 2017

(54) SYSTEMS AND METHODS FOR QUEUE MANAGEMENT

(71) Applicant: Cubic Corporation, San Diego, CA (US)

(72) Inventor: Paul Monk, Surrey (GB)

(73) Assignee: Cubic Corporation, San Diego, CA (US)

( * ) Notice: Subject to any disclaimer, the term of this patent is extended or adjusted under 35 U.S.C. 154(b) by 27 days.

(21) Appl. No.: 14/680,557

(22) Filed: Apr. 7, 2015

(65) Prior Publication Data

US 2015/0286964 A1    Oct. 8, 2015

Related U.S. Application Data

(60) Provisional application No. 61/976,423, filed on Apr. 7, 2014, provisional application No. 61/976,427, filed
(Continued)

(51) Int. Cl.
*G06Q 10/02* (2012.01)
*G06Q 50/30* (2012.01)
(Continued)

(52) U.S. Cl.
CPC ............ *G06Q 10/02* (2013.01); *G06F 3/013* (2013.01); *G06Q 10/0631* (2013.01);
(Continued)

(58) Field of Classification Search
CPC ............ G06Q 10/02; G06Q 10/0631; G06Q 10/06315; G06Q 10/20; G06Q 20/18; G06Q 30/0281; G06Q 30/02; G06Q 50/30; G06F 3/013; G07B 15/00; G07F 9/00; G07F 9/023; G07F 9/026; G07F 11/00;
(Continued)

(56) References Cited

U.S. PATENT DOCUMENTS 5,886,683 A * 3/1999 Tognazzini et al. .......... 715/700
5,953,055 A * 9/1999 Huang et al. .................. 348/155
(Continued)

FOREIGN PATENT DOCUMENTS

| EP | 1246146 A2 | 10/2002 |
|---|---|---|
| EP | 2105889 A2 | 9/2009 |

(Continued)

OTHER PUBLICATIONS

Di Fabbrizio, Giuseppe, et al. "Unifying conversational multimedia interfaces for accessing network services across communication devices." Multimedia and Expo, 2000. ICME 2000. 2000 IEEE International Conference on. vol. 2. IEEE, 2000.*
(Continued)

*Primary Examiner* — Kevin H Flynn
*Assistant Examiner* — Scott M Tungate
(74) *Attorney, Agent, or Firm* — Kilpatrick Townsend and Stockton, LLP

(57) ABSTRACT

A queue management scheme whereby a system-wide status is considered together with a status of each and every specific or particular queue and associated device within the system, in order to efficiently and effectively balance the needs and desires of customers with the needs and desires of an entity that provides services to the customers.

19 Claims, 9 Drawing Sheets

Related U.S. Application Data on Apr. 7, 2014, provisional application No. 61/976,430, filed on Apr. 7, 2014.

(51) Int. Cl.

| | | |
|---|---|---|
| *G06Q 10/00* | (2012.01) | |
| *G06Q 20/18* | (2012.01) | |
| *G06Q 30/02* | (2012.01) | |
| *G07B 15/00* | (2011.01) | |
| *G06F 3/01* | (2006.01) | |
| *G06Q 10/06* | (2012.01) | |
| *G07F 17/42* | (2006.01) | |
| *G07F 19/00* | (2006.01) | |
| *G07F 9/00* | (2006.01) | |
| *G07F 9/02* | (2006.01) | |
| *G07F 11/00* | (2006.01) | |
| *G07C 11/00* | (2006.01) | |

(52) U.S. Cl.
CPC ....... *G06Q 10/06315* (2013.01); *G06Q 10/20* (2013.01); *G06Q 20/18* (2013.01); *G06Q 30/0281* (2013.01); *G06Q 50/30* (2013.01); *G07B 15/00* (2013.01); *G07F 9/00* (2013.01); *G07F 9/023* (2013.01); *G07F 9/026* (2013.01); *G07F 11/00* (2013.01); *G07F 17/42* (2013.01); *G07F 19/201* (2013.01); *G07F 19/207* (2013.01); *G06F 3/011* (2013.01); *G06Q 30/02* (2013.01); *G07C 2011/04* (2013.01)

(58) Field of Classification Search
CPC ...... G07F 17/42; G07F 19/201; G07F 19/207; G07F 3/011; G07C 2011/04
See application file for complete search history.

(56) References Cited

U.S. PATENT DOCUMENTS

| | | | | |
|---|---|---|---|---|
| 8,315,909 | B1* | 11/2012 | Barker | 705/16 |
| 2002/0139842 | A1* | 10/2002 | Swaine | G06F 3/011 |
| | | | | 235/379 |
| 2002/0153417 | A1* | 10/2002 | Imazuka | 235/382 |
| 2003/0105685 | A1 | 6/2003 | Millikan | |
| 2007/0100677 | A1 | 5/2007 | Boss | |
| 2007/0265935 | A1 | 11/2007 | Woycik et al. | |
| 2011/0078637 | A1* | 3/2011 | Inderrieden et al. | 715/866 |
| 2011/0144801 | A1 | 6/2011 | Selker et al. | |
| 2011/0166884 | A1* | 7/2011 | Lesselroth et al. | 705/3 |
| 2011/0276695 | A1 | 11/2011 | Maldaner | |
| 2012/0047233 | A1 | 2/2012 | Jin | |
| 2012/0207350 | A1 | 8/2012 | Loos et al. | |
| 2012/0281094 | A1* | 11/2012 | Forshaw | 348/150 |
| 2013/0005443 | A1 | 1/2013 | Kosta et al. | |
| 2013/0031202 | A1 | 1/2013 | Mick et al. | |
| 2014/0247232 | A1* | 9/2014 | George-Svahn | G06F 3/02 |
| | | | | 345/173 |
| 2015/0073590 | A1* | 3/2015 | Garcia Manchado | G06Q 20/18 |
| | | | | 700/232 |
| 2015/0106520 | A1 | 4/2015 | Breitgand et al. | |
| 2015/0286964 | A1 | 10/2015 | Monk | |
| 2015/0286993 | A1 | 10/2015 | Monk | |

FOREIGN PATENT DOCUMENTS

| | | |
|---|---|---|
| EP | 2579193 A1 | 4/2013 |
| GB | 2452504 A | 3/2009 |
| WO | 2006/009972 A1 | 1/2006 |
| WO | 2013/153740 A2 | 10/2013 |

OTHER PUBLICATIONS

Julier, S., et al., "Information Filtering for Mobile Augmented Reality", Augmented Reality, 2000. (ISAR 2000). Proceedings. IEEE and ACM International Symposium on Munich, Germany, Oct. 5-6, 2000, Piscataway, New Jersey, USA, IEEE. Oct. 5, 2000, XP010520304, DOI: 10.1109/ISAR.2000.880917, ISBN: 978-0-7695-0846-7. pp. 3-11.

Keil, Jens, et al., "Controlling and Filtering Information Density with Spatial Interaction Techniques via Handheld Augmented Reality", Virtual Augmented and Mixed Reality. Designing and Developing Augmented and Virtual Environments, Springer Berlin Heidelberg, Berlin Heidelberg, Jul. 21, 2013. XP047031869, ISBN: 978-3-642-39404-1, pp. 49-57.

International Search Report and Written Opinion for PCT/US2015/024741 dated Jul. 6, 2015, 141 pages.

International Search Report and Written Opinion for PCT/US2015/024743 dated Jul. 6, 2015, 44 pages.

International Search Report and Written Opinion for PCT/US2015/024737 dated Aug. 13, 2015, 114 pages.

U.S. Appl. No. 14/680,568, filed Apr. 7, 2015, First Action Interview Pilot Program Pre-Interview Communication dated Aug. 4, 2015, all pages.

U.S. Appl. No. 14/680,571, filed Apr. 7, 2015, First Action Interview Pilot Program Pre-Interview Communication dated Aug. 18, 2015, all pages.

International Search Report and Written Opinion dated Jul. 6, 2015 for International Application PCT/US2015/024747; all pages.

International Preliminary Report on Patentability dated Oct. 20, 2016 for International Patent Application No. PCT/US2015/024741, filed Apr. 7, 2015; all pages.

* cited by examiner

700

SYSTEMS AND METHODS FOR QUEUE MANAGEMENT

CROSS-REFERENCE TO RELATED APPLICATIONS

This application claims the benefit of U.S. Prov. Pat. App. Ser. No. 61/976,423, filed 7 Apr. 2014, and claims the benefit of U.S. Prov. Pat. App. Ser. No. 61/976,427, filed 7 Apr. 2014, and claims the benefit of U.S. Prov. Pat. App. Ser. No. 61/976,430, filed 7 Apr. 2014, the entirety of each of which is hereby incorporated by reference for all intents and purposes.

SUMMARY

Although the present disclosure is not so limited, a method may include or comprise: monitoring, by a computing system, a customer queue for an in-service transit ticketing device at a transit system; determining, by the computing system based on the monitoring, that a parameter associated with customer wait time to interact with the in-service transit ticketing device is greater than or equal to a particular threshold value; and in response to the determining, controlling the type of content output for presentation by the in-service transit ticketing device to decrease customer wait time to interact with the in-service transit ticketing device.

Although the present disclosure is not so limited, a transit ticket vending machine may include or comprise: at least one processor; at least one display screen; at least one audio speaker; and at least one non-transitory memory element communicatively coupled with and readable by the at least one processor, and having stored therein processor-readable instructions that when executed by the at least one processor cause the at least one processor to: determine that a parameter associated with customer wait time to interact with the transit ticket vending machine is greater than or equal to a particular threshold value and, in response, control the type of content output by at least one of the at least one display screen and the at least one audio speaker to decrease customer wait time to interact with the transit ticket vending machine device.

Although the present disclosure is not so limited, a method may include or comprise: receiving, by a computing device, queue-specific status data for an in-service transit ticketing device of a transit system; determining, by the computing device, to regulate the output of at least one of audio content and image content by the in-service transit ticketing device based upon the queue-specific status data for the in-service transit ticketing device of the transit system; in response to the determining, tracking gaze of a particular customer at on-screen content of a display of the in-service transit ticketing device to determine or estimate intent of the particular customer; and outputting particular content for presentation by the in-service transit ticketing device based on the gaze of the particular customer at on-screen content.

DETAILED DESCRIPTION

The present disclosure is generally directed to or towards systems and methods for queue management. More specifically, a queue management scheme is contemplated whereby a system-wide status is considered together with a status of each and every specific or particular queue and associated device within the system, in order to efficiently and effectively balance the needs and desires of customers with the needs and desires of an entity that provides services to the customers. It is contemplated that the features or aspects of the present disclosure may be applicable in or to many different implementation-specific scenarios.

Figure 1:
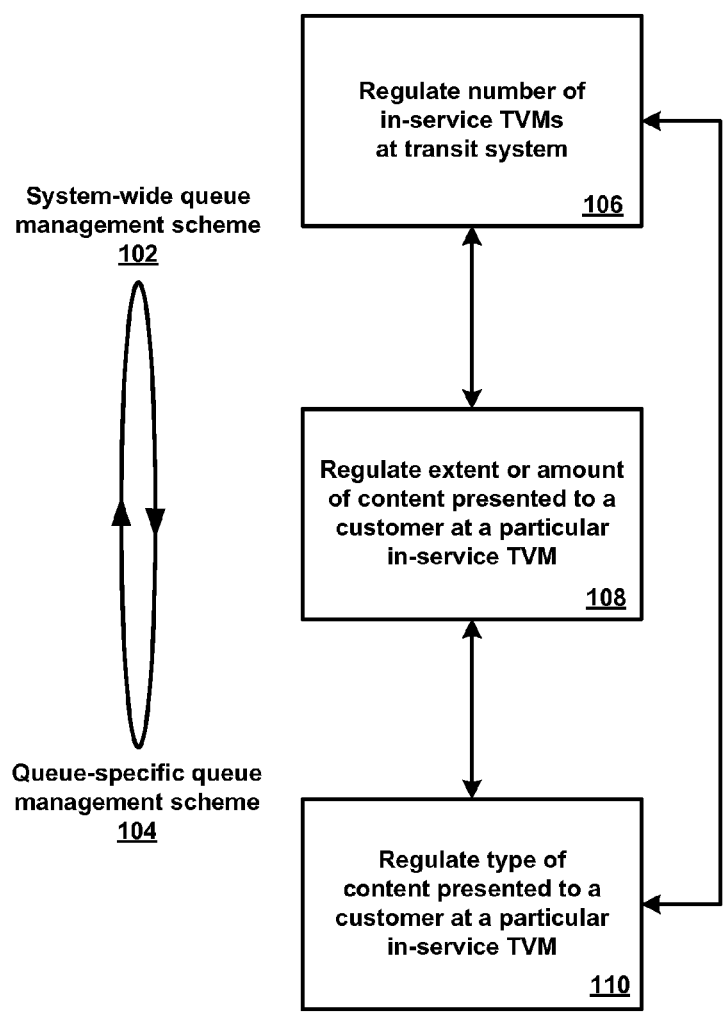
FIG. 1 shows a first example method according to the disclosure.

For instance, referring now to FIG. 1, a first example method 100 is shown in accordance with the principles of the present disclosure, specifically, in the context of transit system queue management. In this example, status or state of each one of a plurality of TVMs (Transit Ticket Vending Machines) at a transit system or station is influenced and controlled based upon a system-wide queue management scheme 102 and a queue-specific management scheme 104. As illustrated in FIG. 1, there is a synergistic or complementary relationship between the system-wide queue management scheme 102 and the queue-specific management scheme 104. This is because, as contemplated throughout, the system-wide queue management scheme 102 is affected by the queue-specific management scheme 104, and vice versa.

At step 106, a controller of the transit system may regulate the number of individual TVMs of the plurality of TVMs that are in-service at the transit system at any given time. In general, a particular "in-service" TVM may be accessible to dispense transit tickets to customers, for example, whereas a particular "out-of-service" TVM may not be accessible to dispense transit tickets to customers. In practice, the controller may enable or disable, activate or deactivate, commission or decommission, etc., at least one of the plurality of TVMs based upon a derived usage of the TVMs at any given time. For example, it is contemplated that by utilizing camera and image processing to determine length/time of each particular TVM queue, the controller may fully or at least partially power-down at least one of the plurality of TVMs. It is further contemplated that the state or status of the transit system as a whole, together with the state or status of each particular TVM, and the state or status of each associated TVM queue, may be considered during the process of regulating the number of individual TVMs of the plurality of TVMs that are in-service at the transit system at any given time. Example details to such an implementation, along with a description of the various associated benefits and advantages, are discussed in further detail below in connection with at least FIG. 6.

At step 108, a controller of the transit system may regulate the extent or amount of content presented to a customer interacting with a particular TVM that is in-service at the transit system at any given time. In general, the content may be considered supplemental or auxiliary content that is different than content that might normally be displayed to a customer purchasing a transit ticket for example. In practice, the controller may modify or change or reformat, etc., supplemental or auxiliary content queued for presentation by a particular TVM based upon a derived usage of the particular TVM at any given time. For example, it is contemplated that by utilizing camera and image processing to determine length/time of a queue associated with the particular TVM, the controller may prevent altogether the display of advertisement or transit station information, not default back to a screen-saver, remove or prevent from display superfluous screen text, and etc. It is further contemplated that the state or status of the transit system as a whole, together with the state or status of each particular TVM, and the state or status of each associated TVM queue, may be considered during the process of regulating the extent or amount of content presented to a customer interacting with a particular TVM that is in-service at the transit system at any given time. Example details to such an implementation, along with a description of the various associated benefits and advantages, are discussed in further detail below in connection with at least FIG. 7.

At step 110, a controller of the transit system may regulate the type of content presented to a customer interacting with a particular TVM that is in-service at the transit system at any given time. In general, the content may be considered supplemental or auxiliary content that is different than content that might normally be displayed to a customer purchasing a transit ticket, for example. In practice, the controller may select a "type" of supplemental or auxiliary content for presentation by the particular TVM based upon a number of parameters, including derived usage of the particular TVM at any given time. For example, it is contemplated that by utilizing camera and image processing to determine length/time of a queue associated with the particular TVM, together with face recognition and eye tracking, the controller may select particular transit system service or advertising content to be output for display by the particular TVM based on known or derived knowledge of the customer, the current situational context at the location of the particular TVM, and/or other factors. It is further contemplated that the state or status of the transit system as a whole, together with the state or status of each particular TVM, and the state or status of each associated TVM queue, may be considered during the process of regulating the type of content presented to a customer interacting with a particular TVM that is in-service at the transit system at any given time. Example details to such an implementation, along with a description of the various associated benefits and advantages, are discussed in further detail below in connection with at least FIG. 8.

For the purpose of discussion, the queue management scheme of the present disclosure is presented in the context of transit system queue management. In practice, a transit-system-wide status is considered together with a status of each and every specific or particular TVM queue and associated TVM within the transit system, in order to efficiently and effectively balance the needs and desires of transit customers with the needs and desires of an entity that provides services to the transit customers. Although not so limited, an appreciation of the various aspects of the present disclosure may be gained from the following discussion in connection with the drawings.

Figure 2:
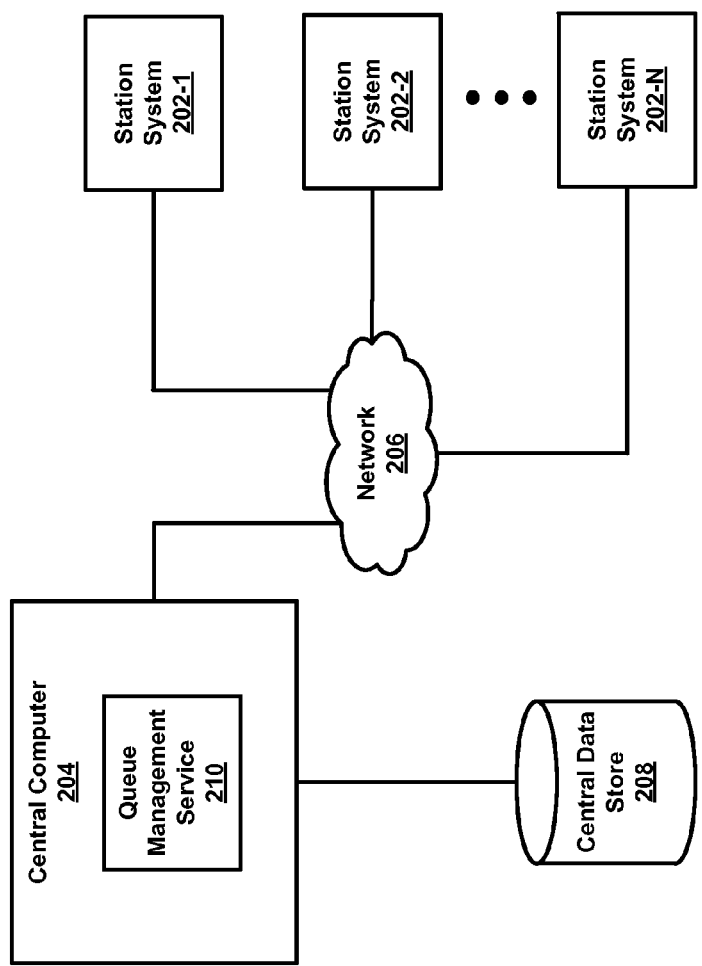
FIG. 2 shows an example computing environment according to the disclosure.

For instance, referring now to FIG. 2, a block diagram of an example transit system 200 is shown in accordance with the principles of the present disclosure. In general, the transit system 200 may provide access to transit services (not shown) to users of the transit system 200, record transactions of the users, collect transit fares, and enable the multivariate queue management techniques of the present disclosure, as discussed in detail below. The transit system 200 may include various forms of transit, such as subway, bus, ferry, commuter rail, para-transit, and so on, or any combination thereof, which may be accessed at stations and/or other locations throughout the transit system 200. As indicated in FIG. 2, the transit system 200 may include or comprise any number of stations, with any number of corresponding transit or station systems 202 (e.g., 202-1, 202-2, . . . , 202-N, where N is an integer value).

Put generally, the functionality of the transit system 200 is as follows. To gain access to transit services, users may present fare media at access control points, which may include a turnstile, fare gate, platform validator, para-transit vehicle, bus, conductor handheld unit, or fare box at an entry, exit, or other location of a transit station. Transactions of a user, such as passage at a transit access control points, may frequently occur at stations of the transit system 200, although it will be understood that access control points may exist elsewhere, such as on busses or trains. Each of the station systems 202 may gather information regarding transactions and communicate, individually, in batches, on a scheduled/periodic basis, on a real-time/near-real-time/delayed basis, etc., the information to a central computer or server 204 via WAN (Wide Area Network) 206.

The WAN 206 may include one or more networks, such as the Internet, that may be public, private, or a combination thereof. The WAN 206 may support packet-switched or circuit-switched connections using telephone lines, coaxial cable, optical fiber, wireless communication, satellite links, and/or other mechanisms for communication. Thus, the usage of fare media such as a transit card (e.g. magnetic, contactless, etc.), an identification card, a bank card, a mobile phone, or other item presented for passage at access control points throughout the transit system 200 may be recorded, monitored, etc., by the central computer 204 and/or stored, along with related data, in a central datastore 312 (e.g., in a database or other data storage structure) for subsequent access thereby.

Additionally, the central computer 204 may exhibit an instance of a QMS (Queue Management Service) 210 that which may enable the queue management scheme contemplated throughout in that a transit-system-wide status is considered together with a status of each and every specific or particular TVM queue and associated TVM within the transit system, in order to efficiently and effectively balance the needs and desires of transit customers with the needs and desires of an entity that provides services to the transit customers. In general, the QMS 210 may include or comprise logical modules of hardware, software, firmware, or any combination thereof, and additional or other instances the QMS 210 may be incorporated into the transit system 200 to enable the features of aspects of the present disclosure.

Figure 3:
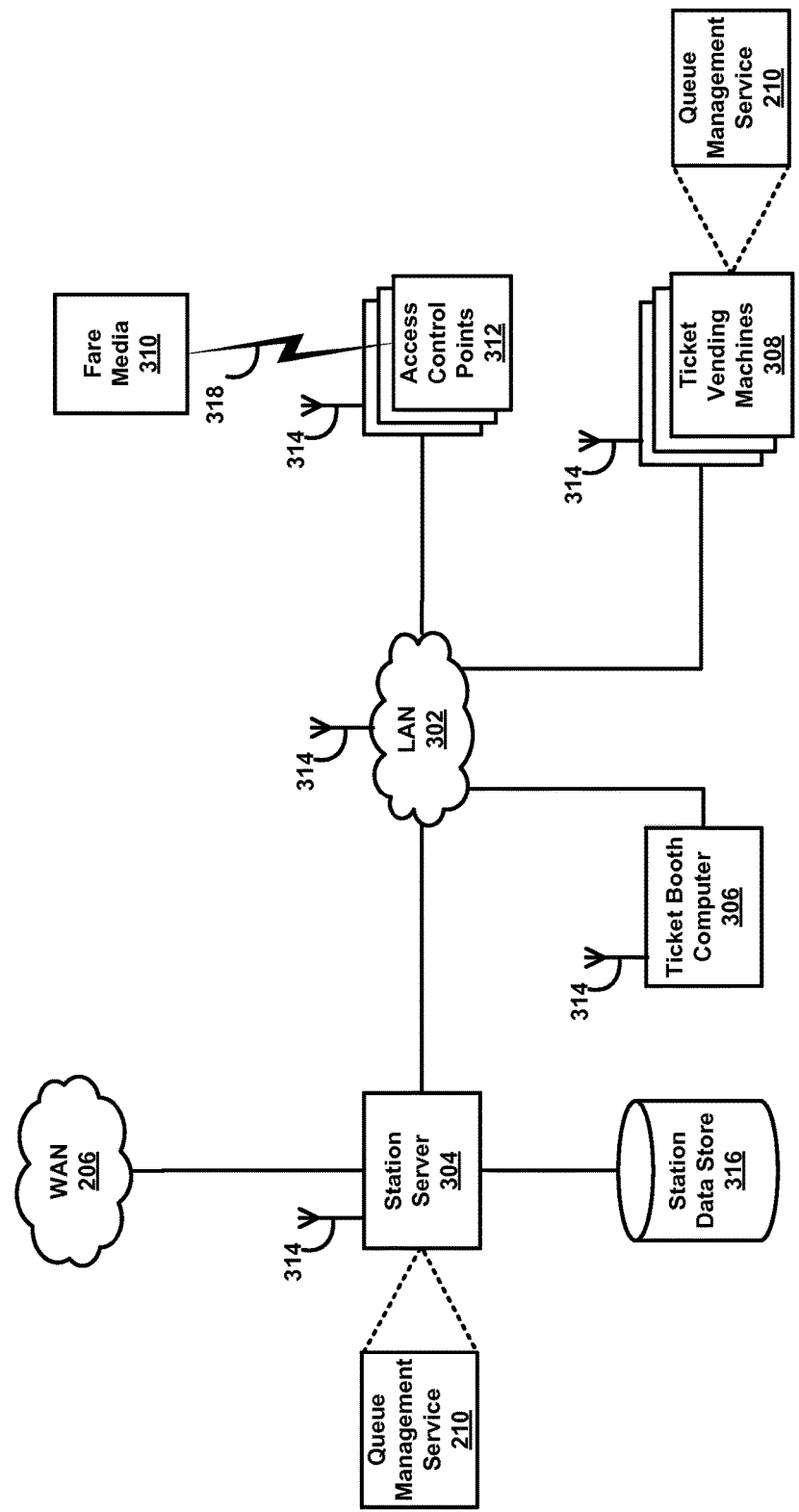
FIG. 3 shows another example computing environment according to the disclosure.

For instance, referring now to FIG. 3, a block diagram of an example station system 202 is shown in accordance with the principles of the present disclosure. As mentioned above, the example transit system 200 of FIG. 2 may include or comprise various forms of transit, such as subway, bus, ferry, commuter rail, para-transit, and more. Because different forms of transit may require different functionality, each instance of a station system 202 may have some or all of the components shown in the block diagram of FIG. 3, whereby a LAN (Local Area Network) 302 communicatively couples the various systems together and could include point-to-point connections, packet-switched connections, wireless connections, and/or other networking techniques.

As shown in FIG. 3, a station server 304 may be coupled to the WAN 206 to enable bi-directional communication between the station server 304 and the central computer 204 (see FIG. 2). Processing of local information may be performed on or by the station server 304. For example, fare information, schedule information, delay update information, and other transit related information may be processed at the station server 304 and communicated to the various other machines or elements in the transit system 200. Additionally, the station server 304 may exhibit an instance of a QMS 210 that which may enable the queue management scheme of the present disclosure, discussed in detail below.

Among other functions, a ticket booth computer 306 and each of a plurality of TVMs 308 of the station system 202 as shown in FIG. 3 may be used to create and/or distribute fare media 310, such as magnetic fare cards. Each instance of a TVM 308 may be operated by a transit user and/or remotely operated by a transit employee or operator. Additionally, each instance of a TVM 308 may exhibit an instance of a QMS 210 that which may enable the queue management scheme of the present disclosure, discussed in detail below. The ticket booth computer 306 may be a computer within a ticket booth and utilized by a transit employee or operator to issue an instance of fare media 310, perform fare media verification, and perform other functions. Also shown in FIG. 3 is or are a plurality of access control points 312.

In practice, the ticket booth computer 306, access control points 312, and TVMs 308 may communicate with the central computer 204 through the station server 304 and/or directly with the central computer 204 via the LAN 302 and WAN 206. As previously indicated, access control points 312 may communicate transactional information with the station server 304, which may relay transactional information to the central computer 204. This communication may be transmitted via a physical connection or wireless connection via one or more antennas 314. Furthermore, transactional data and/or related lists may be maintained on a station datastore 316. Other information may be maintained or stored in or on station datastore 316, including data or information accessible by the QMS 210 of one or both of the stations server 304 and TVMs 308 of FIG. 3 to enable the queue management scheme of the present disclosure, discussed in detail below. Various media may be used as fare media 310 in the transit system 200. For example, a user may utilize an NFC-enabled mobile device to transmit an identification code and/or other information to an access control point 312 for passage at or through the access control point 312. Such a transmission 318 may be wireless, such as by NFC communication. Additionally or alternatively, other media having a unique identification code, readable by access control points 312, may be used. By way of example, but not by limitation, this may include magnetic stripe cards, RFID (Radio-Frequency Identification) tags and/or RFID-tagged items, a smart card, and items having a bar code.

Figure 4:
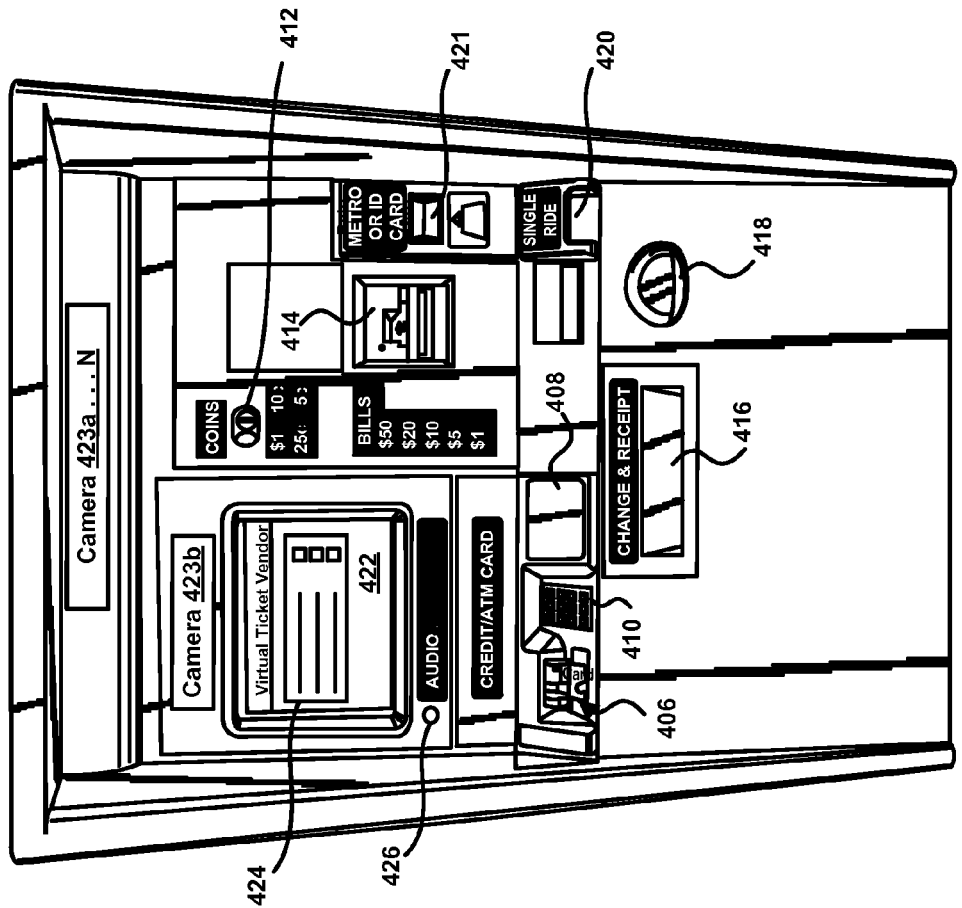
FIG. 4 shows an example transit-related device according to the disclosure.
Figure 5:
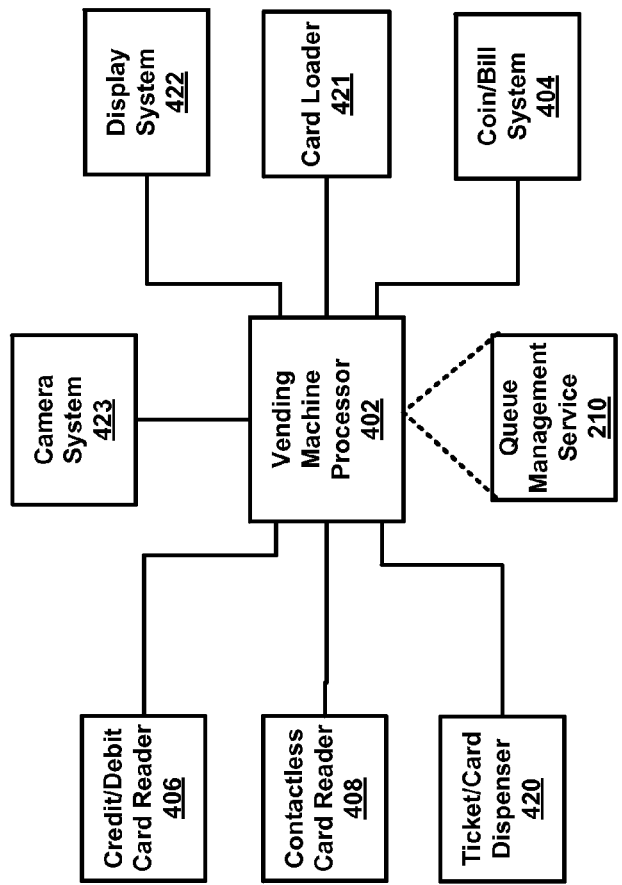
FIG. 5 shows the device of FIG. 4 in block diagram form.

As mentioned above, a queue management scheme is contemplated in that a transit-system-wide status is considered together with a status of each and every specific or particular TVM queue and associated TVM within the transit system, in order to efficiently and effectively balance the needs and desires of transit customers with the needs and desires of an entity that provides services to the transit customers. In this example implementation-specific scenario, it is contemplated that the instance of the QMS 210 on the station server 304 may serve as a system-level or system-wide controller, and that each instance of the QMS 210 on a particular TVM 308 may serve as a machine-specific controller, and that together each instance of the QMS 210 in the example transit system 202 may enable the queue management scheme of the present disclosure. In general, the station server 304, and also each particular instance of a TVM 308 as discussed throughout, is a computing system or device, an example of which is discussed in detail below in connection with FIG. 9. FIGS. 4-5 illustrate additional aspects of each particular instance of a TVM 308.

In particular, FIGS. 4-5 show, respectively, a perspective view and block diagram of an example TVM 308. In this example, a vending machine processor 402 is coupled to the other components of the TVM 308 and transmits and receives signals to and from other subsystems to cause the same to perform their intended functions. Reloadable prepaid cards and other fare cards may be purchased and/or reloaded with value at the TVM 308. A coin/bill system 404, credit/debit card reader 406, and contactless card reader 408 are used to make payments for transactions at the TVM 308. A pin pad 410 may be provided adjacent to the credit/debit card reader 406 to enter numerical information such as a PIN code for a debit card. A coin slot 412 and bill loader 414 are used to accept cash. Change is returned in a change/receipt slot 416 and coin return 418. Newly-issued reloadable prepaid cards, reloadable fare cards, and receipts are also provided in the change/receipt slot. The TVM 308 may further dispense single-ride fare cards through card dispenser 420, which is coupled with a card storage unit (not shown) storing reloadable prepaid cards for distribution. Information regarding transactions may be communicated through the LAN 302 by the vending machine processor 402 using, for example, a network interface (not shown).

Information regarding transactions may be communicated to various entities. For example, it may be communicated to a central ticketing system to create a transit user account, a card issuer to approve and/or activate a card, or another entity. It will be understood that a card issuer may comprise a financial institution, which may receive communication from the TVM 308 via a financial network, a central ticketing system, and/or WAN 206. Moreover, a prepaid account associated with a reloadable prepaid card may comprise a funding source maintained by a financial institution (which may be the card issuer of the reloadable prepaid card).

A display system 422 prompts the card holder through the refill/purchase process. For example, the screen may prompt the purchaser to touch a start button/icon on a touch screen display 424 of the display system 422 to begin the process. In an aspect, the touch screen display 424 may display textual instructions for the user after the process has begun. In another aspect, the touch screen display 424 may display supplemental or auxiliary content, the type and form of which may be controlled by the QMS 210 of the TVM 308, as discussed in further detail below in connection with at least FIG. 7 and FIG. 8. Additionally or alternatively, an audio system 426, including a speaker, may produce audio commands. The user may be given a menu of choices of how to proceed. For example, the menu may include choices to purchase a reloadable prepaid card, reload a reloadable prepaid card, purchase a reloadable fare card, reload a reloadable fare card, or purchase a single-ride fare card. It will be understood that, additionally or alternatively to a touch screen display, other input interfaces may be utilized to accept input from a user. This may include, but is not limited to a touchpad, keyboard, mouse, trackball, audio input interface, joystick, etc.

If the user chooses an option requiring payment, the user may be instructed, by menu prompts, pre-recorded video and/or audio, on how to proceed with the payment. The user may be given a choice to pay in cash or by credit/debit card. For cash purchases, the user is instructed to insert coins or bills into the coin slot 412 or the bill loader 414. For credit/debit card purchases, the user is instructed to insert a credit or debit card into the credit/debit card reader 406, or touch an RFID-enabled credit or debit card to contactless card reader 408. If the user chooses to reload a reloadable prepaid card, the user may insert the reloadable prepaid card into reader 406, or touch an RFID-enabled reloadable prepaid card to contactless card reader 408, and proceed with a cash or credit/debit payment.

The example TVM 308 may further exhibit a camera system 423 that many include or comprise a number of camera 423a-N that may operate or function independent from each other. In an aspect, the camera 423a may be utilized to capture images or video of a queue associated with the TVM 308, that in general may be considered a line or sequence of people awaiting their turn to utilize the services of the TVM 308, e.g., purchase a transit ticket. It is contemplated that the captured images or video of the queue associated with the TVM 308 may be transmitted or transferred to the station server 304 for subsequent processing. In particular, the QMS 210 of the station server 304 may analyze the captured images or video of the queue associated with the TVM 308, together or concurrently with the captured images or video of a queue associated with each instance of a TVM 308 in the example transit system 202, in order to determine the length, wait time, average wait time, etc., of each queue in the example transit system 202, and then regulate the number of individual TVMs 308 that are in-service at any given time. An example of such an implementation is discussed in detail at step 106 of FIG. 1, and in detail below in connection with FIG. 6.

In another aspect, the camera 423a may be utilized to capture images or video of a queue associated with the TVM 308, that in general may be considered a line or sequence of people awaiting their turn to utilize the services of the TVM 308, e.g., purchase a transit ticket. It is contemplated that the captured images or video of the queue associated with the TVM 308 may be utilized by the TVM 308 to determine the length, wait time, average wait time, etc., of the queue associated with the TVM 308. Additionally, the camera 423b may be utilized to capture images or video of a customer interacting with the TVM 308, in order to determine the focus of a customer's interest and by extension what the customer might be interested in, and based on such information may determine whether there is interest in an advertisement or service information being provided, or if the customer is seeking to commence a ticket purchase. It is contemplated that based on the such information as captured by the camera 423a and the camera 423b that the QMS 210 of the TVM 308 may regulate the provisioning of information or content by the TVM 308, in terms of an amount and type of information or content output by the TVM 308 for viewing by a customer. An example of such an implementation is discussed in detail at step 108 and step 110 of FIG. 1, and in detail below in connection with FIG. 7 and FIG. 8.

Figure 6:
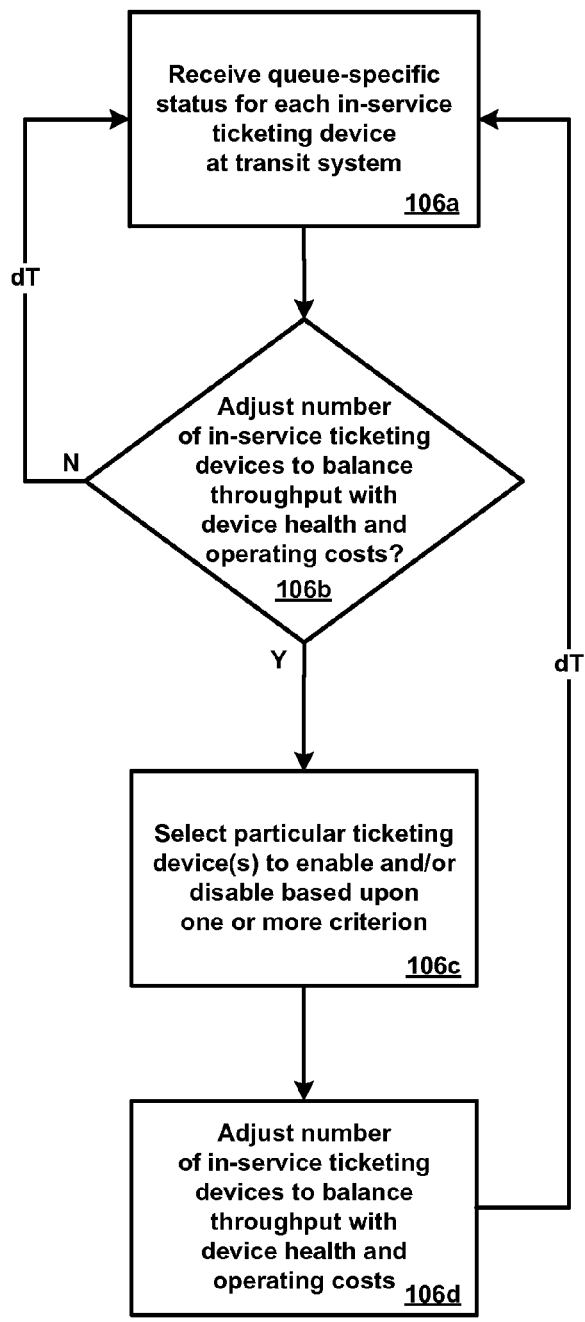
FIG. 6 shows a second example method according to the disclosure.

Referring now to FIG. 6, a second example method 600 is shown in accordance with the principles of the present disclosure. In particular, the method 600 may correspond to a process of regulating a number of in-service TVMs 308 at the transit system 202 of FIG. 2, similar to that discussed above in connection with at least step 106 of FIG. 1. It is contemplated that the method 600 may be implemented wholly or at least partially by the QMS 210 of the central computer 204 of FIG. 2 and/or the QMS 210 of the station server 304 of FIG. 3.

At step 106a, the QMS 210 may receive data corresponding to the queue-specific status for each in-service TVM 308 at or of the transit system 202 of FIG. 2. For example, at a particular point-in-time (e.g., 8 AM, and then 8:15 AM, and then 8:30 AM, and etc. throughout the day) each particular in-service TVM 308 may report to the QMS 210 a number of customers currently waiting to access the services of a corresponding in-service TVM 308, as well as an average customer wait time to access the services of a corresponding in-service TVM 308 (e.g., averaged over a particular predetermined and configurable time period, such as 15 minutes, 30 minutes, etc.). For example, a first in-service TVM 308 may report to the QMS 210 that two (2) customers are currently waiting in line and that average customer wait time is two (2) minutes, a second in-service TVM 308 may report to the QMS 210 that three (3) customers are currently waiting in line and that average customer wait time is four (4) minutes, and so on. In this example, the QMS 210 may be configured and/or arranged to analyze such data and determine whether or not an adjustment to the number of in-service TVMs 308 may be implemented in order to balance customer throughput with device health and operational costs.

For instance, at step 106b, the QMS 210 may determine that the number of in-service TVMs 308 is such that any increase in the number of in-service TVMs 308 would incur operating costs, and possibly prematurely increase the number of in-service hours of any particular TVM 308 at the transit system 202, that outweighs the benefit of increasing customer throughput or decreasing customer in-queue wait times. Alternatively, at step 106b, the QMS 210 may determine that the number of in-service TVMs 308 is such that any decrease in the number of in-service TVMs 308 would have the undesirable effect of decreasing customer throughput or increasing customer in-queue wait times, despite the savings that might gained in terms of device health and operating costs. In such a scenario, it is contemplated that process flow within the method 100 may branch back to step 106a, since there might be no instant advantage to increasing or decreasing the number of in-service TVMs 308 at the transit system 202. Otherwise, process flow within the method 100 may branch to step 106c, since there might be an instant advantage to increasing or decreasing the number of in-service TVMs 308 at the transit system 202.

At step 106c, the QMS 210 may select particular ones of a plurality of TVMs at the transit system 202 to enable or disable, based upon one or more criterion. For example, the QMS 210 may determine that the number of in-service TVMs 308 is such that while any increase in the number of in-service TVMs 308 would incur operating costs, and increase the number of in-service hours of any particular TVM 308 at the transit system 202, customer wait times are such that an increase in the number of in-service TVMs 308 is called for in order to maintain customer satisfaction and/or quality of experience. Here, the QMS 210 may select a particular out-of service TVM 308 to enable or activate based upon, for example, location of the particular out-of service TVM 308 at the transit system 202, and/or based upon the maintenance history of the particular out-of service TVM 308 and/or age (e.g., in-service hours) of the particular out-of service TVM 308. In this example, activating the particular out-of service TVM 308 based upon location of the particular out-of service TVM 308 advantageously may be used to "guide" or "steer" human traffic at the transit system 202 in a manner as desired. For example, if there is significant congestion at a first particular access control point 312 (see FIG. 3), a particular out-of service TVM 308 at or near (relatively) a second particular access control point 312 may be activated or enabled to encourage or direct human traffic towards the second particular access control point 312.

Additionally, activating the particular out-of service TVM 308 based upon the maintenance history and/or age of the particular out-of service TVM 308 may be used to maximize the service lifetime of the particular out-of service TVM 308. For example, if a first particular out-of service TVM 308 in general has more in-service hours logged than a second particular out-of service TVM 308, such as by a factor of two (2) for example, then the second particular out-of service TVM 308 may be activated or enabled instead of the first particular out-of service TVM 308 in order to balance the number of in-service hours logged by TVMs 308 within at or at the transit system 202. It is contemplated that an overall status with respect to a number of in-service hours may be factored into such a decision, for example assume the first particular out-of service TVM 308 has one thousand (1000) in-service hours logged and that the second particular out-of service TVM 308 has five hundred (500) in-service hours logged. Additionally, or alternatively, it is contemplated that a component(s)-component(s) status with respect to a number of in-service hours may be factored into such a decision, for example assume a display screen of the first particular out-of service TVM 308 has one thousand (1000) in-service hours logged and that a display screen of the second particular out-of service TVM 308 has five hundred (500) in-service hours logged.

As another example, the QMS 210 may determine that the number of in-service TVMs 308 is such that a reduction in the number of in-service TVMs 308 would not adversely affect customer in-queue wait times overall at the transit system 202, and further that a savings might gained in terms of device health and operating costs. Here, the QMS 210 may select a particular in-service TVM 308 to disable or deactivate based upon, for example, location of the particular in-service TVM 308 at the transit system 202 and/or based upon the maintenance history of the particular out-of service TVM 308 and/or age (e.g., in-service hours) of the particular in-service TVM 308. In this example, deactivating the particular in-service TVM 308 based upon location of the particular in-service TVM 308 may be used to "guide" human traffic at the transit system 202. For example, if it is observed that there is a tendency for customers to use a particular TVM 308 due to its particular location at the transit system 202, but a desire exists to increase traffic volume at or near a cafeteria or convenience store at the transit station 202 at a different particular location, in order to increase sales, the particular in-service TVM 308 at or near (relatively) the particular location at the transit system 202 may be deactivated or disabled to encourage or direct traffic towards the cafeteria or convince store at the transit station 202.

Additionally, deactivating the particular in-service TVM 308 based upon the maintenance history of the particular in-service TVM 308 and/or age of the particular in-service TVM 308 may be used to maximize the service lifetime of the particular in-service TVM 308. For example, if a first particular in-service TVM 308 in general has more in-service hours logged than a second particular in-service TVM 308, such as by a factor of two (2) for example, then the first particular in-service TVM 308 may be deactivated or disabled instead of the second particular out-of service TVM 308 in order to balance the number of in-service hours logged by TVMs 308 within at or at the transit system 202. It is contemplated that an overall status with respect to a number of in-service hours may be factored into such a decision, for example assume the first particular in-service TVM 308 has one thousand (1000) in-service hours logged and that the second particular in-service TVM 308 has five hundred (500) in-service hours logged. Additionally, or alternatively, it is contemplated that a component(s)-component(s) status with respect to a number of in-service hours may be factored into such a decision, for example assume a display screen of the first particular in-service TVM 308 has one thousand (1000) in-service hours logged and that a display screen of the second particular in-service TVM 308 has five hundred (500) in-service hours logged.

Next, at step 106*d*, the QMS 210 may output one or more commands to one or more in-service TVMs 308 at the transit system 202 and/or one or more commands to one or more out-of-service TVMs 308 at the transit system 202 to control the status of TVMs 308 at the transit system 202, and more specifically to adjust the number of in-service TVMs 308 at the transit system 202. Here, it is contemplated that any particular TVMs 308 at the transit system 202 may in response to a particular command activate or deactivate, enable or disable, commission or decommission, etc., itself altogether or particular systems and/or subsystems integral thereto (e.g., complete or partial shut-down or power-down). It is further contemplated that the adjustment may generally comprise reconfiguring the number of in-service TVMs 308 based upon a number of different factors, such as based upon location of both in-service and out-of service TVM 308 at the transit system 202, in order to guide human traffic at the transit system 202, and/or based upon the maintenance history and/or age of both in-service and out-of service TVM 308 at the transit system 202, in order to maximize the service lifetime of each of the TVMs 308 at the transit system 202.

Such an implementation as discussed in connection with FIG. 6 may provide the ability to balance the queuing time of customers wishing to use ticketing vending machines against the desire to reduce power costs and maximize the service life of equipment. By utilizing camera and image processing to determine the length/time of the queue the vending machines or a central controller may automatically regulate the number of individual machines which are in service at any given time. The machines may also accept external controls to set the desired queue length and/or override as demands require. Further, by integrating the means to identify the size of the queue a set of vending machines is able to adapt its behavior. This may, for example, include powering down one of the devices, reducing some of the power-hungry functions provided by some of the machines in the set, and/or reducing the brightness of the displays until such time as potential customers are identified. These features may be reinstated at times of high-usage/queuing. Such an implementation as discussed in the context of at least FIG. 6 may enable reduced power costs and improved operating efficiency by powering-down unnecessary components and machines without compromising passenger satisfaction, as well as improved efficiency of vending machines due to longer operating life of the devices through avoiding unnecessary operating during periods of no/low use. Other benefits and/or advantages are possible as well.

Figure 7:
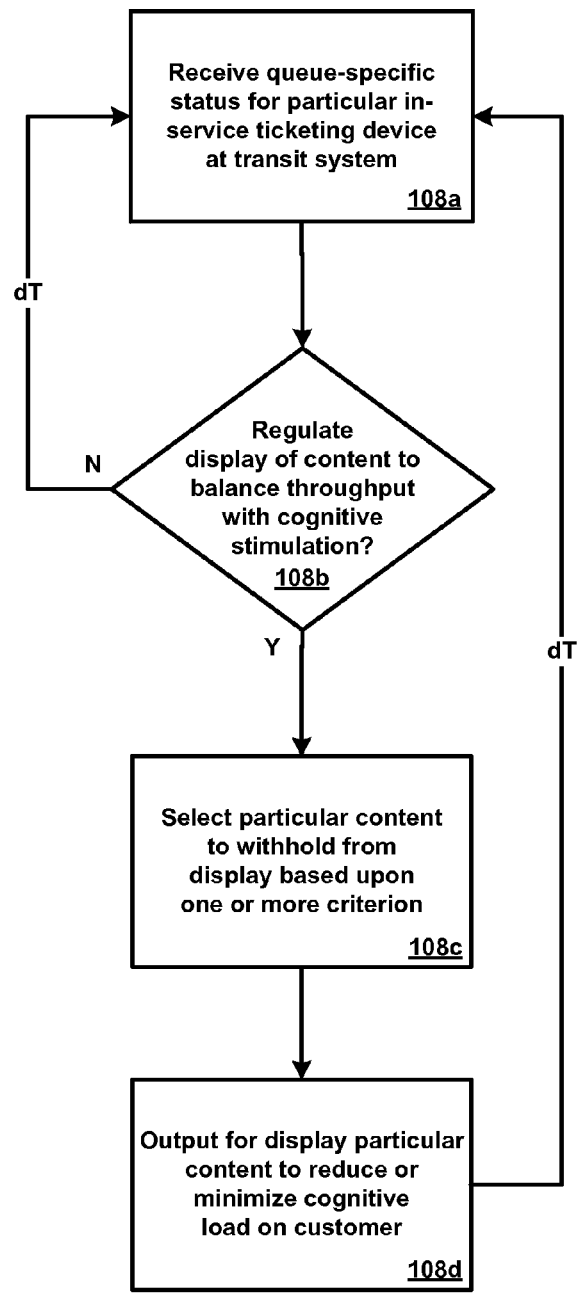
FIG. 7 shows a third example method according to the disclosure.

Referring now to FIG. 7, a third example method 700 is shown in accordance with the principles of the present disclosure. In particular, the method 700 may correspond to a process of regulating the extent or amount of content presented to a customer interacting with a particular in-service TVM 308 at the transit system 202 of FIG. 2, similar to that discussed above in connection with at least step 108 of FIG. 1. It is contemplated that the method 700 may be implemented wholly or at least partially by the QMS 210 of the central computer 204 of FIG. 2 and/or the QMS 210 of the station server 304 and/or the QMS 210 of a particular TVM 308 of FIG. 3.

At step 108a, the QMS 210 may receive data corresponding to the queue-specific status for a particular in-service TVM 308 at or of the transit system 202 of FIG. 2. For example, at a particular point-in-time (e.g., as part of periodic process, the period of which may be configurable and/or adjustable) a particular in-service TVM 308 may report to the QMS 210 a number of customers currently waiting to access the services of the particular in-service TVM 308, as well as an average customer wait time to access the services of the particular in-service TVM 308. For example, the particular in-service TVM 308 may report to the QMS 210 that one (1) customer is currently waiting in line and that average customer wait time is three (3) minutes, based upon an analysis of images or video acquired by camera system 423. In this example, the QMS 210 may be configured and/or arranged to analyze such data and determine whether or not to regulate the extent or amount of content presented to a customer interacting with a particular in-service TVM 308.

In general, such regulation of content may be considered an intent to balance throughput at the particular in-service TVM 308 with cognitive stimulation of a customer currently interacting with the particular in-service TVM 308. For example, if the intent is to increase throughput at the particular in-service TVM 308, it may be beneficial to not output for presentation or display supplemental or auxiliary content via display system 422 and/or audio system 426 that is different than content that might normally be presented to a customer purchasing a transit ticket for example. This is because such content may be distracting to the customer currently interacting with the particular in-service TVM 308 and thus tend to decrease throughput at the particular in-service TVM 308 since the customer might not swiftly purchase a transit ticket for example and then be on their way.

For instance, at step 108b, the QMS 210 may determine based on the number of customers currently waiting to access the services of the particular in-service TVM 308, and/or an average customer wait time to access the services of the particular in-service TVM 308, that the throughput of the particular in-service TVM 308 is at or above maximum allowable capacity. An example of a maximum allowable capacity might include or be defined as (configurable) "number of customers currently waiting to access the services of the particular in-service TVM 308 is greater than or equal to five (5)" and/or "average customer wait time to access the services of the particular in-service TVM 308 is greater than or equal to five (5) minutes." Here, if a particular one or both of such criterion is determined to be satisfied by the QMS 210, then process flow within the method 700 may branch to step 108c. Otherwise, process flow within the method 700 may branch back to step 108a for reset for example when a next customer initially interacts with the particular TVM 308.

At step 108c, the QMS 210 may select particular content to withhold or prevent from display by the particular in-service TVM 308, since the throughput of the particular in-service TVM 308 is at or above maximum allowable capacity (as determined at step 108b). For example, the QMS 210 may prevent altogether the display of advertisement or transit station content, remove or prevent from display superfluous screen text, remove or prevent from display certain animations, remove or prevent from display certain images, remove or prevent from display certain content in a certain color other than black/white, such as red content, remove or prevent from display certain content that might be considered disorientating, such as "striped" content, prevent output of audio, and etc. In this manner, it is contemplated that the QMS 210 may select any particular content to withhold or prevent from display by the particular in-service TVM 308 that might in some way be considered distracting to a customer currently interacting with the particular in-service TVM 308. Put differently, it is contemplated that the QMS 210 may select particular content from a plurality of content to present or display by the particular in-service TVM 308 that might in some way not be considered distracting to a customer currently interacting with the particular in-service TVM 308. In addition, such a determination may be made based on demographic information derived based on video and/or image acquisition capabilities of the particular in-service TVM 308.

For example, based upon an analysis of images or video acquired by camera system 423, the particular in-service TVM 308 may withhold or prevent from display by the particular in-service TVM 308 any content that might be considered distracting by an adult male, such as an advertisement for a new and improved razor for the face. As another example, based upon an analysis of images or video acquired by camera system 423, the particular in-service TVM 308 may withhold or prevent from display by the particular in-service TVM 308 any content that might be considered distracting by an adult female, such as an advertisement for woman's sporting equipment at a local sporting goods store. As another example, based upon an analysis of images or video acquired by camera system 423, the particular in-service TVM 308 may withhold or prevent from display by the particular in-service TVM 308 any content that might be considered distracting by a young adult, such as a music video (and/or audio) of a particular artist. Still many other examples are possible as well.

Next, at step 108d, the QMS 210 may output one or more commands to the particular in-service TVM 308 in order to output for display by the particular in-service TVM 308 particular content with the intent to reduce or minimize cognitive load on the customer currently interacting with the particular in-service TVM 308. In other words, the QMS 210 may output one or more commands to the particular in-service TVM 308 to only output content that might be considered not a distraction since the throughput of the particular in-service TVM 308 is at or above maximum allowable capacity. For example, the particular in-service TVM 308 may initially be configured and/or arranged to output a plurality of supplemental or auxiliary content that is different than content that might normally be displayed to a customer purchasing a transit ticket, in addition to the content that might normally be displayed to the customer purchasing the transit ticket. At step 108d, however, the particular in-service TVM 308 may be commanded to prevent or withhold from output or display by the particular in-service TVM 308 at least one piece of content of the plurality of supplemental or auxiliary content that is different than content that might normally be displayed to a customer purchasing a transit ticket, and instead only output or display the content that might normally be displayed to the customer purchasing the transit ticket.

Such an implementation as discussed in connection with FIG. 7 may provide the ability to balance the queuing time of customers wishing to use ticketing vending machines against the desire to provide supplemental/auxiliary information to customers. Traditional public transit ticket machines may utilize standard graphical user interfaces to deliver a set of options and menus to customers. Such machines though do not take into account any form of queue management based upon observing the number of waiting customers. Due to this limitation the form of these menus is not dependent upon the number of waiting customers. Embodiments of the present disclosure, however, integrate the means to identify the size of the queue, thereby providing for a machine able to adapt its behavior. This may, for example, include preventing the display of auxiliary service information, not defaulting back to a screen-saver, removing superfluous text from the screen, etc. By reducing the cognitive load on the customer and removing unnecessary steps in the operation of the device the overall transaction times may be reduced. These features may be reinstated at times of low-usage/queuing. Such an implementation as discussed in the context of at least FIG. 7 may enable improved customer satisfaction due to reduced queuing times, optimized use of vending resources, due to the reduced need to open and staff alternative outlets at times of transient increased customer load, and improved customer experience, by reducing superfluous options and information to permit focus and reduced cognitive load during the sales process. Other benefits and/or advantages are possible as well.

Figure 8:
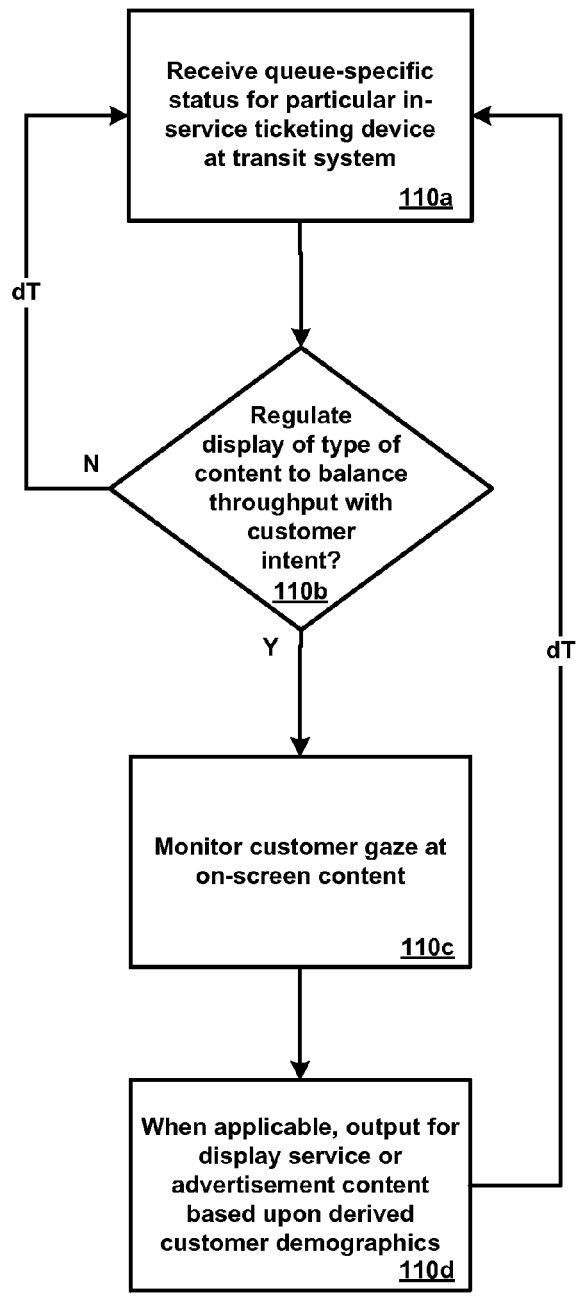
FIG. 8 shows a fourth example method according to the disclosure.

Referring now to FIG. 8, a fourth example method 800 is shown in accordance with the principles of the present disclosure. In particular, the method 800 may correspond to a process of regulating the type of content presented to a customer interacting with a particular in-service TVM 308 at the transit system 202 of FIG. 2, similar to that discussed above in connection with at least step 110 of FIG. 1. It is contemplated that the method 800 may be implemented wholly or at least partially by the QMS 210 of the central computer 204 of FIG. 2 and/or the QMS 210 of the station server 304 and/or the QMS 210 of a particular TVM 308 of FIG. 3.

At step 110a, the QMS 210 may receive data corresponding to the queue-specific status for a particular in-service TVM 308 at or of the transit system 202 of FIG. 2. For example, at a particular point-in-time, a particular in-service TVM 308 may report to the QMS 210 a number of customers currently waiting to access the services of the particular in-service TVM 308, as well as an average customer wait time to access the services of the particular in-service TVM 308. For example, the particular in-service TVM 308 may report to the QMS 210 that four (4) customers are currently waiting in line and that average customer wait time is four (4) minutes. In this example, the QMS 210 may be configured and/or arranged to analyze such data and determine whether or not to regulate the type of content presented to a customer interacting with a particular in-service TVM 308.

In general, such regulation of content may be considered an intent to balance throughput at the particular in-service TVM 308 with estimated intent of a customer currently interacting with the particular in-service TVM 308. For example, if the intent is to increase throughput at the particular in-service TVM 308, and the intent of the customer is determined as "interested" in certain or particular content, it may be beneficial to not output for display supplemental or auxiliary content that is estimated to be not something necessarily of-interest to the customer. This is because such content may be distracting or unwelcome to the customer currently interacting with the particular in-service TVM 308 and thus tend to decrease throughput at the particular in-service TVM 308, since the customer might be irritated or bothered or distracted by the supplemental or auxiliary content not of-interest and thus not be focused on purchasing a transit ticket and looking at the content of-interest.

For instance, at step 110b, the QMS 210 may determine based on the number of customers currently waiting to access the services of the particular in-service TVM 308, and/or an average customer wait time to access the services of the particular in-service TVM 308, that the throughput of the particular in-service TVM 308 is at or above maximum allowable capacity. An example of a maximum allowable capacity might include or be defined as or by "number of customers currently waiting to access the services of the particular in-service TVM 308 is greater than or equal to three (3)" and/or "average customer wait time to access the services of the particular in-service TVM 308 is greater than or equal to four (4) minutes." Here, if a particular one or both of such criterion is determined to be satisfied by the QMS 210, then process flow within the method 800 may branch to step 110c. Otherwise, process flow within the method 800 may branch back to step 108a for reset for example when a next customer initially interacts with the particular TVM 308.

At step 110c, the QMS 210 may monitor the gaze of the customer while (at least) "looking" at on-screen content. For example, the QMS 210 may determine that the customer is not looking at content that might normally be displayed to the customer purchasing the transit ticket. For example, the QMS 210 may determine that the customer is not looking at a menu of transit ticket prices, destinations, etc., but instead is looking at supplemental or auxiliary content that is different than content that might normally be displayed to a customer purchasing a transit ticket. In this example, the supplemental or auxiliary content may be located in a "corner" or "periphery" of the screen, as compared to a "central" location of the screen where the content that might normally be displayed to a customer purchasing a transit ticket is displayed, and thus the QMS 210 may easily discern that the customer is not looking at the menu of transit ticket prices because the gaze and thus the eyes of the customer is not at the central location of the screen. In a similar manner, the QMS 210 may easily discern that the customer is looking at the menu of transit ticket prices when the gaze of the customer is at the central location of the screen. When though the gaze of the customer is determined to be at the corner or periphery of the screen, for example, the QMS 210 may modify the content as displayed on the screen in terms of content and/or or placement of the content in order to balance throughput at the particular in-service TVM 308 with estimated intent of a customer currently interacting with the particular in-service TVM 308.

For example, at step 110d, the QMS 210 may modify the content as displayed on-screen so the supplemental or auxiliary content located in the corner or periphery of the screen is rearranged so as to be side-by-side or adjacent the menu of transit ticket prices, such as in a 50-50 split screen format for example. In this example, the location of the supplemental or auxiliary content is changed, and possibly the relative "size" of the supplemental or auxiliary content may be changed. For example, the location of the supplemental or auxiliary content may be changed from the corner or periphery to centrally located on the screen, and the size of the supplemental or auxiliary content may be changed from 50 centimeter square to 100 centimeter square when observed on screen. Other or additional aspects are contemplated as well.

For example, the "type" of the supplemental or auxiliary content may be changed, and/or additional supplemental or auxiliary content may be displayed based upon estimated demographics of the customer currently interacting with the particular in-service TVM 308. For example, the supplemental or auxiliary content initially located in the corner or periphery of the screen may comprise of a text only advertisement "PM Sporting Goods" for a sporting goods store. In this example, the QMS 210 may determine based upon a video or image acquired of the customer that the customer is "female," and at step 110*d* the QMS 210 may modify the content as displayed on-screen so the supplemental or auxiliary content "PM Sporting Goods" located in the corner or periphery of the screen is changed to "PM Sporting Goods: Women Athletic Gear Sale" and rearranged so as to be side-by-side or adjacent the menu of transit ticket prices, such as in a 50-50 split screen format similar to that described above. Other examples are possible as well.

Such an implementation as discussed in connection with FIG. 8 may provide the ability of advertising or service information on passenger-oriented ticket vending machines without impacting the general throughput of the ticket retailing channel. By incorporating an integral camera or similar imaging device the vending machine shall have the ability to determine the focus of the customer's interest, which based on knowledge of the visual information displayed shall be sufficient to determine whether there is interest in the advertisement or service information being provided, or if the customer is seeking to commence a ticket purchase. The automatic nature of the decision making shall ensure that the display of advertising or service material is optimized, which may similarly include displaying further detail should the customer be deemed to be interested, and ensuring that customers are not unduly presented with advertising or service information when it is not welcomed.

Further, by incorporating face recognition and eye tracking capabilities it is possible to determine the source of attention of the customer and to use this to optimize the presentation of information. In particular, the machine may be employed to provide service or advertising information based on knowledge of the customer (general classification—male, female, young, old, and/or other demographic information), the context (location, time of day, type of station) that the machine is located at, and/or other factors. Such an implementation as discussed in the context of at least FIG. 8 may enable improved customer satisfaction when presenting advertising or service information by ensuring information and offers remain relevant, increased operator revenues by permitting the presentation of advertising information without unduly impacting the throughput of the machine, the potential to provide improved user interfaces on ticket vending machines, by being able to record and analyze the customer behavior when presented with screens of information, using the technology which has been integrated to support the above functionality, and an analysis of the findings may permit optimization of the information presentation and screen design through facilitating analytical verification.

As discussed above, the present disclosure is directed to a queue management scheme whereby a system-wide status is considered together with a status of each and every specific or particular queue and associated device within the system, in order to efficiently and effectively balance the needs and desires of customers with the needs and desires of an entity that provides services to the customers. Advantageously, equipment life may be maximized and operational costs minimized due to the intelligent control of device in a manner as contemplated throughout. Across a large network a significant cost benefit may be realized. Relatedly, operational status reporting data may be reduced or minimized, thereby ensuring that redundant data (e.g., for machines which are not in operation) can be suppressed and the associated cognitive load of supervisors and staff reduced.

In accordance with the principles of the present disclosure, it is contemplated that a method may include or comprise monitoring, by a computing system, a customer queue for an in-service transit ticketing device at a transit system, determining, by the computing system based on the monitoring, that a parameter associated with customer wait time to interact with the in-service transit ticketing device is greater than or equal to a particular threshold value, and, in response to the determining, controlling the type of content output for presentation by the in-service transit ticketing device to decrease customer wait time to interact with the in-service transit ticketing device.

Here, the computing system may determine that an average customer wait time in a queue associated with the in-service transit ticketing device at the transit system is greater than or equal a particular threshold value of five (5) minutes for example. As another example, the computing system may determine that an average number of customers waiting in the queue associated with the in-service transit ticketing device at the transit system is greater than or equal a particular threshold value of five (5) people for example. Based on such an analysis, the computing system may determine that the average customer wait time and/or or the average number of people in the queue associated with the in-service transit ticketing device at the transit system is such that it may be beneficial to regulate the type content presented to a customer interacting with the in-service transit ticketing device.

In general, such regulation of content may be considered an intent to balance throughput at the in-service transit ticketing device with estimated intent of a customer currently interacting with the in-service transit ticketing device. For example, if the intent is to increase throughput at the in-service transit ticketing device, and the intent of the customer is determined as "interested" in certain or particular content, it may be beneficial to not output for display supplemental or auxiliary content that is estimated to be not something necessarily of-interest to the customer. An example of such an implementation is discussed above in connection with at least FIG. 8. Advantageously, such an implementation may provide the ability of advertising or service information on passenger-oriented ticket vending machines without impacting the general throughput of the ticket retailing channel.

For example, the in-service transit ticketing device may track the gaze of a particular customer at on-screen content of a display of the in-service transit ticketing device to determine or estimate intent of the particular customer, and output particular image or video content for presentation by the in-service transit ticketing device based on the gaze of the particular customer at on-screen content. As another example, the in-service transit ticketing device may output particular audio content for presentation by the in-service transit ticketing device based on the gaze of the particular customer at on-screen content. As another example, the in-service transit ticketing device may output particular advertising content for presentation by the in-service transit ticketing device based on the gaze of the particular customer at on-screen content. As another example, the in-service transit ticketing device may output particular transit system status content for presentation by the in-service transit ticketing device based on the gaze of the particular customer at on-screen content. Other examples are possible as well.

For example, the in-service transit ticketing device may track the gaze of a particular customer at on-screen content of a display of the in-service transit ticketing device to determine or estimate intent of the particular customer, and adjust location of display of particular on-screen screen from a first location to a second different location based on the gaze of the particular customer at on-screen content, and/or adjust size or dimension of display of particular on-screen screen from a first size or dimension to a second different size or dimension based on the gaze of the particular customer at on-screen content. In these examples, the in-service transit ticketing device may manipulate the display of on-screen content to cater to the estimated intent of the particular customer. For example, an advertisement initially positioned at a "corner" of a display screen may be repositioned to a substantially "central" position or location of the display screen so as to even more fully catch the attention of the particular customer. Additionally, or alternatively, the advertisement initially positioned at a "corner" of a display screen may be modified in terms of form and/or content so as to even more fully catch the attention of the particular customer. For example, a relative size or dimension of the advertisement may be modified from relatively "small" to relatively "large" so as to even more fully catch the attention of the particular customer. As another example, the advertisement may be modified from a relatively "small" graphic or logo to a relatively "large" graphic or logo that has or includes or exhibits more or greater detail than the "small" graphic or logo.

Figure 9:
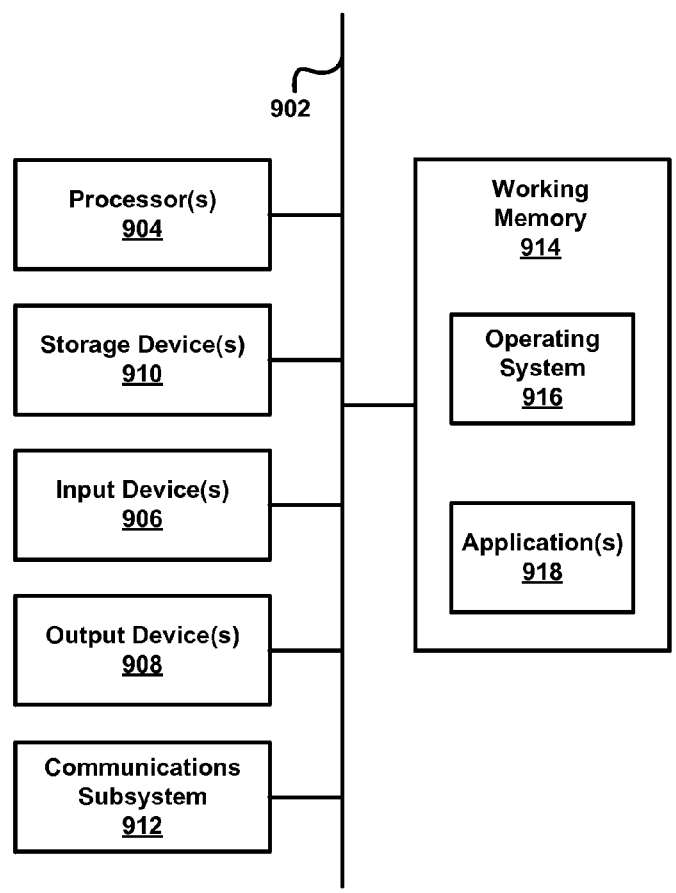
FIG. 9 shows an example computing system or device according to the disclosure.

FIG. 9 shows an example computer system or device 900 in accordance with the principles of the present disclosure. An example of a computer system or device includes an enterprise server, blade server, desktop computer, laptop computer, tablet computer, personal data assistant, smartphone, a ticket booth computer, an access control point, a ticket vending machine, and/or any other type of computing system or device. The computer system 900 may be wholly or at least partially incorporated as part of any of the previously-described computing devices or equipment, as shown and discussed above in connection with FIGS. 1-9. Further, the computer device 900 may be configured to perform and/or include instructions that, when executed, cause the computer system 900 to perform particular steps of the method of at least one of FIG. 1 and FIGS. 6-8. Accordingly, the computer system or device 900 is an example of a special-purpose computer that may implement the features or aspects of the present disclosure. In particular, a queue management scheme whereby a system-wide status is considered together with a status of each and every specific or particular queue and associated device within the system, in order to efficiently and effectively balance the needs and desires of customers with the needs and desires of an entity that provides services to the customers.

The computer device 900 is shown comprising hardware elements that may be electrically coupled via a bus 902 (or may otherwise be in communication, as appropriate). The hardware elements may include a processing unit with one or more processors 904, including without limitation one or more general-purpose processors and/or one or more special-purpose processors (such as digital signal processing chips, graphics acceleration processors, and/or the like); one or more input devices 906, which may include without limitation a remote control, a mouse, a keyboard, and/or the like; and one or more output devices 908, which may include without limitation a presentation device (e.g., television), a printer, and/or the like.

The computer system 900 may further include (and/or be in communication with) one or more non-transitory storage devices 910, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 900 might also include a communications subsystem 912, which may include without limitation a modem, a network card (wireless or wired), an infrared communication device, a wireless communication device, and/or a chipset such as a Bluetooth™ device, an 902.11 device, a WiFi device, a WiMax device, cellular communication facilities (e.g., GSM, WCDMA, LTE, etc.), and/or the like. The communications subsystem 912 may permit data to be exchanged with a network, other computer systems, and/or any other devices described herein. In many examples, the computer system 900 will further comprise a working memory 914, which may include a random access memory and/or a read-only memory device, as described above.

The computer device 900 also may comprise software elements, shown as being currently located within the working memory 914, including an operating system 916, device drivers, executable libraries, and/or other code, such as one or more application programs 918, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described systems and methods.

A set of these instructions and/or code might be stored on a non-transitory computer-readable storage medium, such as the storage device(s) 910 described above. In some cases, the storage medium might be incorporated within a computer system, such as computer system 900. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 900) to perform methods in accordance with various examples of the invention. According to a set of examples, some or all of the procedures of such methods are performed by the computer system 900 in response to processor 904 executing one or more sequences of one or more instructions (which might be incorporated into the operating system 916 and/or other code, such as an application program 918) contained in the working memory 914. Such instructions may be read into the working memory 914 from another computer-readable medium, such as one or more of the storage device(s) 910. Merely by way of example, execution of the sequences of instructions contained in the working memory 914 may cause the processor(s) 904 to perform one or more procedures of the methods described herein.

The terms machine-readable medium (media) and computer-readable medium (media), as used herein, may refer to any medium that participates in providing data that causes a machine to operate in a specific fashion. In an example implemented using the computer device 900, various computer-readable media might be involved in providing instructions/code to processor(s) 904 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 910. Volatile media may include, without limitation, dynamic memory, such as the working memory 914.

Example forms of physical and/or tangible computer-readable media may include a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer may read instructions and/or code.

Various forms of computer-readable media may be involved in carrying one or more sequences of one or more instructions to the processor(s) 904 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 912 (and/or components thereof) generally will receive signals, and the bus 902 then might carry the signals (and/or the data, instructions, etc. carried by the signals) to the working memory 914, from which the processor(s) 904 retrieves and executes the instructions. The instructions received by the working memory 914 may optionally be stored on a non-transitory storage device 910 either before or after execution by the processor(s) 904.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    monitoring, by a computing system, a customer queue for an in-service transit ticketing device at a transit system;
    determining, by the computing system based on the monitoring of the customer queue, that a parameter associated with customer wait time to interact with the in-service transit ticketing device is greater than or equal to a particular threshold value;
    determining, by the computing system, to increase customer throughput at the in-service transit ticketing device based on the parameter being greater than or equal to the particular threshold value;

determining, by the computing system, to not default back to a screen saver after each transaction with the in-service ticketing device;

monitoring an interaction with the in-service transit ticketing device by a particular customer based on the determination to increase customer throughput, wherein the monitoring comprises determining, using a camera of the in-service transit ticketing device that is directed to capture a particular customer's face, a location on a display of the in-service transit ticketing device to which the particular customer's gaze is directed;

identifying demographic information associated with the particular customer using the camera of the in-service transit ticketing device;

identifying on-screen content that is displayed on the location of the display;

determining that the particular customer is interested in the identified on-screen content based on the interaction being monitored using the camera; and in response to determining to increase customer throughput and the determination that the particular customer is interested in the identified on-screen content, determining not to output at least some selected auxiliary content that is unrelated to the identified on-screen content while continuing to output the identified on-screen content for presentation by the in-service transit ticketing device to decrease customer wait time to interact with the in-service transit ticketing device, wherein the at least some selected auxiliary content that is not outputted is selected based at least in part on the identified demographic information.

2. The method of claim 1, wherein:
monitoring the customer queue for the in-service transit ticketing device comprising monitoring the customer queue using via an image capture system;
the parameter comprises an average customer wait time;
the particular threshold value comprises a time threshold value; and
determining that the parameter associated with the customer wait time to interact with the in-service transit ticketing device is greater than or equal to the particular threshold value is based on an analysis of at least one image acquired by the image capture system.

3. The method of claim 1, wherein:
monitoring the customer queue for the in-service transit ticketing device comprising monitoring the customer queue using an image capture system;
the parameter comprises total number of customers in the customer queue;
the particular threshold value comprises an integer threshold value; and
determining that the parameter associated with the customer wait time to interact with the in-service transit ticketing device is greater than or equal to the particular threshold value is based on an analysis of at least one image acquired by the image capture system.

4. The method of claim 1, wherein:
the identified on-screen content matching the interest of the particular customer comprises a particular image or video content for presentation by the in-service transit ticketing device based on the gaze of the particular customer directed at on-screen content.

5. The method of claim 1, wherein:
the method further comprises outputting particular audio content for presentation by the in-service transit ticketing device based on the interest of the particular customer at on-screen content.

6. The method of claim 1, wherein:
the identified on-screen content comprises particular transit system status content.

7. The method of claim 1, wherein:
the method further comprises adjusting a location of display of particular on-screen content from a first location to a second different location based on the interest of the particular customer directed at on-screen content.

8. The method of claim 1, wherein:
the method further comprises adjusting a size or a dimension of particular on-screen content presented on the display of the in-service transit ticketing device from a first size or dimension to a second different size or dimension based on the interest of the particular customer directed at on-screen content.

9. A transit ticket vending machine, comprising:
at least one processor;
at least one display screen;
at least one audio speaker; and
at least one non-transitory memory element communicatively coupled with and readable by the at least one processor, and having stored therein processor-readable instructions that when executed by the at least one processor cause the at least one processor to:
determine that a parameter associated with customer wait time to interact with the transit ticket vending machine is greater than or equal to a particular threshold value;
determine to increase customer throughput at the transit ticketing vending machine based on the parameter being greater than or equal to the particular threshold value;
determine to not default back to a screen saver after each transaction with the in-service ticketing device;
monitor an interaction with the in-service transit ticketing device by a particular customer based on the determination to increase customer throughput, wherein the monitoring comprises determining, using a camera of the in-service transit ticketing device that is directed to capture a particular customer's face, a location on a display of the in-service transit ticketing device to which the particular customer's gaze is directed;
identify demographic information associated with the particular customer using the camera of the in-service transit ticketing device;
identify on-screen content that is displayed on the location of the display;
determine that the particular customer is interested in the identified on-screen content based on the interaction being monitored using the camera; and
in response to determining to increase customer throughput and the determination that the particular customer is interested in the identified on-screen content, determining not to output at least some selected auxiliary content that is unrelated to the identified on-screen content while continuing to output the identified on-screen by at least one of the at least one display screen and the at least one audio speaker to decrease customer wait time to interact with the transit ticket vending machine device, wherein the at least some selected auxiliary content that is not outputted is selected based at least in part on the identified demographic information.

10. The transit ticket vending machine of claim 9, wherein the processor-readable instructions when executed by the at least one processor cause the at least one processor to:
the parameter comprises an average customer wait time in a customer queue for the transit ticket vending machine; and
the particular threshold value comprises a time threshold value.

11. The transit ticket vending machine of claim 9, wherein the processor-readable instructions when executed by the at least one processor cause the at least one processor to:
the parameter comprises a total number of customers in a customer queue for the transit ticket vending machine; and
the particular threshold value comprises an integer threshold value.

12. The transit ticket vending machine of claim 9, further comprising at least one camera, and wherein:
the content matching the interest of the particular customer comprises a particular image or video content.

13. The transit ticket vending machine of claim 9, further comprising at least one camera, and wherein:
the content matching the interest of the particular customer comprises particular audio content output by the at least one audio speaker.

14. The transit ticket vending machine of claim 9, further comprising at least one camera, and wherein:
the content matching the interest of the particular customer comprises particular transit system status content output by at least one of the at least one display screen and the at least one audio speaker.

15. The transit ticket vending machine of claim 9, further comprising at least one camera, and wherein:
the processor-readable instructions when executed by the at least one processor cause the at least one processor to adjust a location of display of particular on-screen content by the at least one display screen from a first location to a second different location based on the interest of the particular customer directed at on-screen content.

16. The transit ticket vending machine of claim 9, wherein the processor-readable instructions when executed by the at least one processor cause the at least one processor to:
the processor-readable instructions when executed by the at least one processor cause the at least one processor to adjust a size or a dimension of particular on-screen content presented on the at least one display screen from a first size or dimension to a second different size or dimension based on the interest of the particular customer directed at on-screen content.

17. The transit ticket vending machine of claim 9, further comprising an additional camera, and wherein the processor-readable instructions when executed by the at least one processor cause the at least one processor to:
monitor by the additional camera a customer queue for the transit ticket vending machine to derive the parameter associated with customer wait time.

18. The transit ticket vending machine of claim 9, wherein the processor-readable instructions when executed by the at least one processor cause the at least one processor to:
overwrite a value of the particular threshold value to the at least one non-transitory memory element from a first value to a second different value in response to a detected user-input.

19. A method, comprising:
receiving, by a computing device, queue-specific status data for an in-service transit ticketing device of a transit system;
determining, by the computing device, to increase customer throughput at the in-service transit ticketing device based on the queue-specific status data;
determining, by the computing device, to regulate the output of at least one of audio content and image content by the in-service transit ticketing device based upon the determination to increase customer throughput;
determining, by the computing system, to not default back to a screen saver after each transaction with the in-service ticketing device;
in response to the determining to regulate the output, tracking gaze of a particular customer at on-screen content of a display of the in-service transit ticketing device, wherein the gaze tracking comprises determining, using a camera of the in-service transit ticketing device that is directed to capture the particular customer's face, a location on a display of the in-service transit ticketing device to which the particular customer's gaze is directed;
identifying demographic information associated with the particular customer using the camera of the in-service transit ticketing device;
identifying on-screen content that is displayed on the location of the display;
determining that the particular customer is interested in the identified on-screen content based on the interaction being monitored using the camera; and
determining not to output at least some selected auxiliary content that is unrelated to the identified on-screen content while continuing to output the identified on-screen content for presentation by the in-service transit ticketing device based on the determination to increase customer throughput and the determination that the particular customer is interested in the identified on-screen content, wherein the at least some selected auxiliary content that is not outputted is selected based at least in part on the identified demographic information.

* * * * *